G. H. McFEATERS.
PIPE HANGER OR SUPPORT.
APPLICATION FILED MAY 18, 1911.
1,063,566.　　　　　　　　　　　　　　　Patented June 3, 1913.
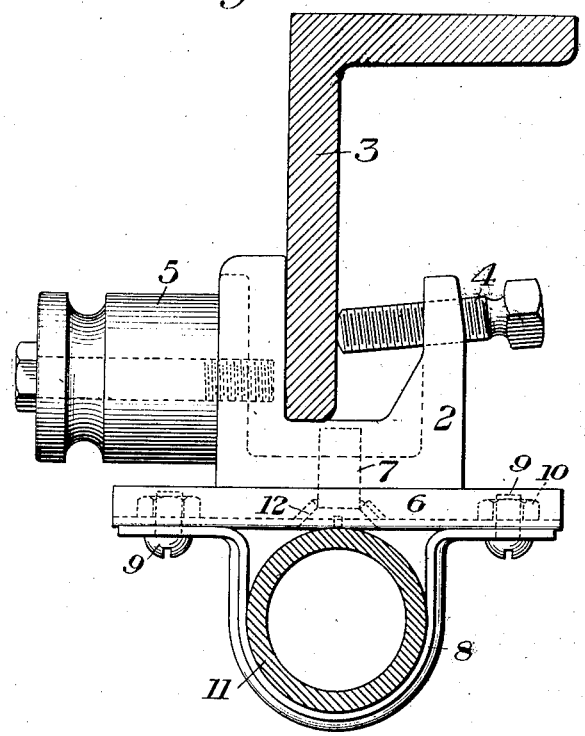
Fig. 1.
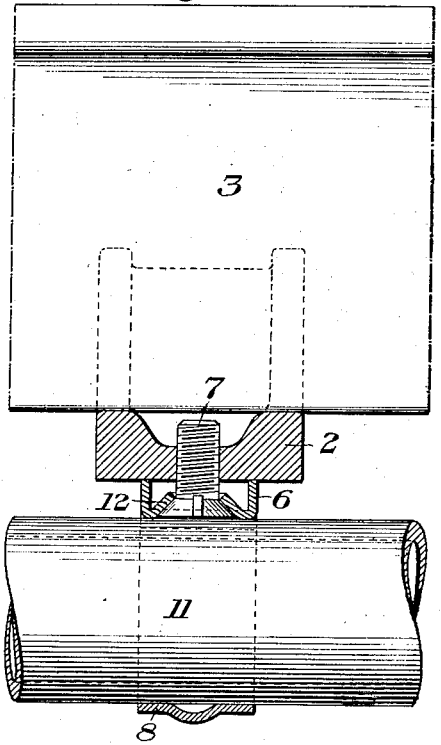
Fig. 2.
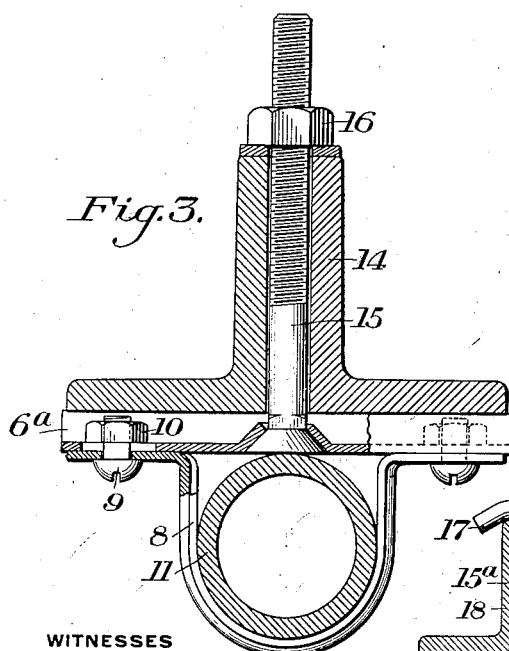
Fig. 3.
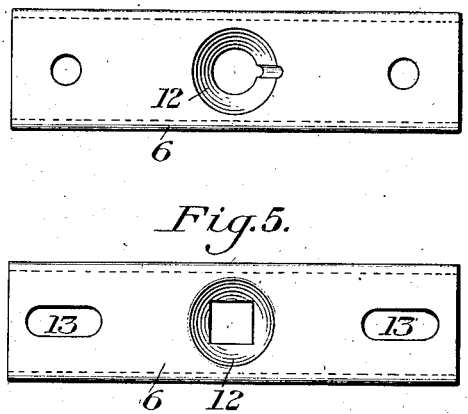
Fig. 4.
Fig. 5.
Fig. 6.
WITNESSES　　　　　　　　　　　　　　　　INVENTOR

UNITED STATES PATENT OFFICE.

GEORGE H. McFEATERS, OF JOHNSTOWN, PENNSYLVANIA.

PIPE HANGER OR SUPPORT.

1,063,566.    Specification of Letters Patent.    Patented June 3, 1913.

Application filed May 18, 1911. Serial No. 628,139.

*To all whom it may concern:*

Be it known that I, GEORGE H. McFEATERS, of Johnstown, Cambria county, Pennsylvania, have invented a new and useful Improvement in Pipe Hangers or Supports, of which the following is a full, clear, and exact description, reference being had to the accompanying drawings, forming part of this specification, in which:—

Figure 1 is a sectional view showing one form of my invention; Fig. 2 is a side view of the same; Fig. 3 is a sectional view showing a modification; Figs. 4 and 5 are inverted plan views showing different forms of the channel members of the support or hanger; and Fig. 6 is a detail sectional view showing another modification.

My invention has relation to pipe hangers or supports, and is designed to provide means of simple, efficient and inexpensive character for supporting pipes from the structural work of buildings and the like; and to this end my invention consists in a pipe hanger or support having the novel features of construction and arrangement hereinafter described and pointed out in the appended claims.

Referring first to that form of my invention illustrated in Figs. 1 and 2, the numeral 2 designates an insulator support of the general character described and claimed in my Patent No. 746,362, dated December 6, 1903, for insulator hanger or bracket, and which is of a character which can be readily attached to the flange of a structural element, such as the angle 3, by means of a clamping screw or screws 4, this insulator support having two or more faces to either of which an insulator 5 may be attached, as more fully described in my said patent.

6 designates a channel member, which is placed against one of the faces (the lower face in the present instance) of the insulator support 2, and which is secured thereto by a screw 7 which may engage the threaded perforation formed in said support for the screw which secures an insulator.

8 is a pipe supporting strap of general U-form, which is secured to the under side of the channel member 6 by screw bolts 9 and nuts 10.

11 designates a pipe supported in the strap 8.

It will be readily seen that the channel members 6 together with the strap 8 may be turned at any desired angle, the channel shape of the member 6 forming seats for the nuts 10 and preventing them from engaging or catching the hanger 2. The head of the screw 7 is preferably countersunk in the channel section, as indicated at 12. The holes 13 in the ends of the channel section may be elongated as shown in Fig. 5 to form slots so as to permit of some adjustment of the strap 8 and also the use of straps of different sizes.

Fig. 3 shows a modification of my invention, which is adapted for attachment to a structural element composed of two angles 14 placed back to back, and without the use of an insulator support or hanger. In this construction the channel member $6^a$, corresponding to the channel section 6 is secured directly to the under side of the angles 14 by means of the screw 15, which extends upwardly between the two angles and is secured by means of the nut 16 resting on the upper edges of the vertical flanges of the angles.

In the modification shown in Fig. 6, the screw $15^a$ is provided with a hook 17 at its upper end adapted to hook over an angle 18 or other structural element. Or I may employ an ordinary nail or spike and bend over its end to form a hook.

The advantages of my invention will be readily appreciated by those skilled in the art. In the form shown in Figs. 1 and 2, it provides a common device for supporting both an insulator and a pipe from a structural element in a simple and convenient manner. In the form shown in Figs. 3 and 6 it provides a simple and convenient device for supporting the pipe independently of an insulator support. In the form shown in these figures, the pipe may extend at any angle, as in the form shown in Figs. 1 and 2. The pipes may be either steam or gas pipes, or pipes carrying electric wires, or of any other character.

What I claim is:—

1. A device of the character described, comprising a support having means for clamping it to a structural element, a single channel member extending in a transverse direction with relation to the pipe, a pipe supporting strap, means for securing the ends of the strap to the ends of the channel member, and means for securing the channel member to the support; substantially as described.

2. A pipe support or hanger, comprising a single channel member, said channel member having openings through each end thereof, a pipe-supporting strap, securing screws passing through openings in the ends of the pipe-supporting strap and the openings in the ends of the channel member, and a supporting device passing through an opening in the center of the channel member; substantially as described.

3. A pipe support or hanger, comprising a single channel member, said channel member having openings through each end thereof, a pipe-supporting strap, securing screws passing through openings in the ends of the pipe-supporting strap and the openings in the ends of the channel member, a supporting device passing through an opening in the center of the channel member, and means for preventing the rotation of the supporting device; substantially as described.

4. A device of the character described, comprising a device having two upwardly extending jaws, a clamping screw having threaded engagement with one of the jaws for clamping the device to a support, a single member having a channel extending in a transverse direction with relation to the pipe, there being openings through each end of said member, a pipe supporting strap, means passing through openings in the channel member for securing the strap thereto, and means for securing the channel member to the lower face of the jaw device; substantially as described.

In testimony whereof, I have hereunto set my hand.

GEORGE H. McFEATERS.

Witnesses:
GEO. B. BLEMING,
GEO. H. PARMELEE.